(12) United States Patent  (10) Patent No.: US 7,506,906 B1
DeHoff et al.  (45) Date of Patent: Mar. 24, 2009

(54) VEHICLE BUMPER ASSEMBLY

(75) Inventors: Eric A. DeHoff, Marysville, OH (US); Warren A. Day, Dublin, OH (US)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 12/177,761

(22) Filed: Jul. 22, 2008

(51) Int. Cl.
*B60R 19/48* (2006.01)
(52) U.S. Cl. .................. 293/117; 362/505
(58) Field of Classification Search ........... 293/117; 362/505
See application file for complete search history.

(56) References Cited

U.S. PATENT DOCUMENTS 4,058,720 A 11/1977 Renfrow
5,984,389 A 11/1999 Nuber et al.
6,902,215 B1 * 6/2005 Condeelis .................. 293/117
6,951,365 B2 10/2005 Chase et al.
2007/0182175 A1 * 8/2007 Naik et al. ................. 293/117

FOREIGN PATENT DOCUMENTS

JP 2001-191874 7/2001
WO WO 2006/037514 4/2006

* cited by examiner

*Primary Examiner*—Joseph D Pape
(74) *Attorney, Agent, or Firm*—Fay Sharpe LLP

(57) ABSTRACT

A bumper assembly for a vehicle includes a bumper beam extending laterally across the vehicle and a bumper fascia covering the bumper beam. The bumper fascia includes a depending portion extending downward below the bumper beam. A powered vehicle component is mounted in the depending portion of the bumper fascia. A protective bracket is mounted below the bumper beam to prevent or limit contact of the powered vehicle component during a collision impact to the depending portion of the bumper fascia.

20 Claims, 4 Drawing Sheets

VEHICLE BUMPER ASSEMBLY

BACKGROUND

The present disclosure generally relates to an improved vehicle bumper assembly, and more particularly relates to a vehicle bumper assembly having a protector for a powered vehicle component (e.g., a fog light).

Known bumper assemblies typically include a rigid bumper beam extending laterally across the vehicle in which the bumper assembly is deployed. The bumper beam is usually provided at either a forward end of a vehicle to absorb a front end collision or a rearward end of the vehicle to absorb a rear end collision. Typically, the bumper beam is held in its forward or rearward position by the vehicle's longitudinally extending frame rails. Aluminum, including extruded aluminum, and steel are favored materials for use in forming bumper beams, and one favored shape for a bumper beam is a hollow, closed-profile B-shape.

As vehicles become more sophisticated, bumper assemblies often provide additional functionality to vehicles, i.e., functionality in addition to absorbing impact forces during a collision. For example, bumper assemblies are known to carry various powered vehicle components, e.g., fog lights, corner sensors, etc. In designing bumper assemblies, concern is often given to the bumper assembly's ability to, not only absorb impact forces, but to limit damage to vehicle components mounted thereon. This becomes increasingly important when such components are more expensive and/or complicated, which typically occurs with respect to powered vehicle components, such as fog lights, corner sensors, etc.

SUMMARY

According to one aspect, a bumper assembly for a vehicle is provided. More particularly, in accordance with this aspect, the bumper assembly includes a bumper beam extending laterally across the vehicle and a bumper fascia covering the bumper beam. The bumper fascia includes a depending portion extending downward below the bumper beam. A powered vehicle component is mounted in the depending portion of the bumper fascia. A protective bracket is mounted below the bumper beam to limit contact of the powered vehicle component during a collision impact to the depending portion of the bumper fascia.

According to another aspect, a vehicle bumper assembly is provided. More particularly, in accordance with this aspect, the vehicle bumper assembly includes a bumper beam mounted to a vehicle and a bumper fascia disposed over the bumper beam with a depending portion extending below the bumper beam. A vehicle light component is mounted on the depending portion. A protective bracket is mounted below the bumper beam protecting the vehicle light component during a sufficient impact to the depending portion of the bumper fascia by obstructing movement of the vehicle light component into an interior vehicle component disposed inwardly relative to the bumper beam.

According to still another aspect, a protective bracket of a vehicle bumper assembly is provided for a vehicle light component. The vehicle bumper assembly includes a bumper beam and a bracket portion depending downwardly from the bumper beam. More particularly, in accordance with this aspect, the protective bracket includes arms extending inwardly from the bracket portion and a plate supported by the arms. The plate has an innerface spaced in close relation to a tread area of an underside mounted spare tire such that, when an impact is received below the bumper beam, the plate contacts the tread area of the spare tire to prevent the vehicle light component, which is mounted below the bumper beam, from contacting the spare tire.

DETAILED DESCRIPTION

Figure 1:
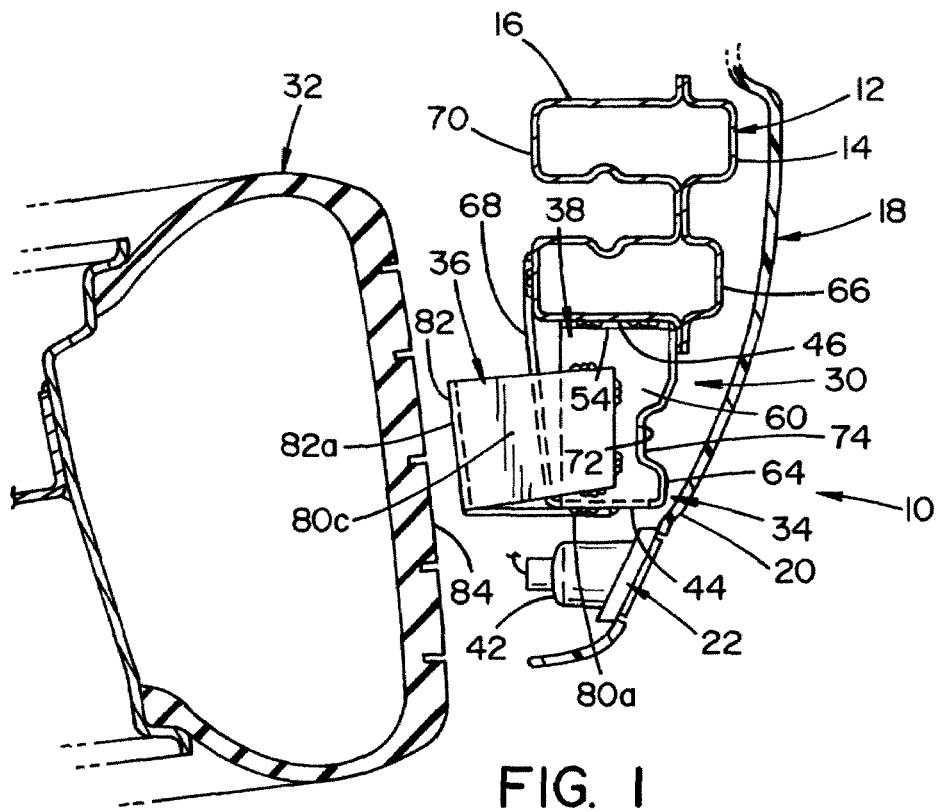
FIG. 1 is a partial cross sectional view of a bumper assembly for a vehicle.

Referring now to the drawings, wherein the showings are for the purposes of showing one or more exemplary embodiments, FIG. 1 shows a vehicle bumper assembly 10 for a vehicle. The bumper assembly 10 includes a bumper beam 12 extending laterally across the vehicle as is known and understood by those skilled in the art. The bumper beam 12 may be mounted to the vehicle by being secured to a pair of spaced apart frame rails (not shown) extending longitudinally along the vehicle. The bumper beam 12 can be formed of steel or aluminum, and in one example is formed of extruded aluminum, which enables the bumper beam to employ the illustrated B-shaped or double-box shaped profile. In particular, the bumper beam 12 can be formed of an outer member 14 and an inner member 16, which when welded together provide a double-boxed structure.

As shown, a bumper fascia 18 may be disposed over the bumper beam 12 to cover the bumper beam 12. The bumper fascia 18 includes a depending portion 20 extending downward below the bumper beam 12. A powered vehicle component 22 is mounted in the bumper assembly 10, and is particularly mounted in the depending portion 20 of the bumper fascia 18. In the illustrated embodiment, the powered vehicle component 22 is a vehicle light component, such as the illustrated fog light. Accordingly, the illustrated vehicle bumper assembly 10 may include a vehicle light component, such as fog light 22, mounted on the depending portion 20 of the bumper fascia 18 and spaced apart vertically below the bumper beam 12. It is to be understood and appreciated by those skilled in the art that the powered vehicle component 22 could be some other powered vehicle component other than the illustrated fog light, e.g., a bumper sensor (such as a corner sensor), another type of vehicle light component, etc.

The vehicle bumper assembly 10 additionally includes a protective bracket 30 mounted below the bumper beam 12 to prevent or limit the powered vehicle component 22 from contact during a collision impact to the depending portion 20 of the bumper fascia 18. In the illustrated embodiment, the bracket 30 is positioned such that the powered vehicle component 22 is disposed vertically below and vertically spaced apart from the bracket 30. As will be described in more detail below, the protective bracket 30 protects the powered vehicle component 22 during a sufficient impact to the depending portion 20 of the bumper fascia by obstructing movement of the powered vehicle component 22 into an interior vehicle component 32. In the illustrated embodiment, the interior vehicle component 32 is a spare tire mounted inwardly relative to the bumper beam 12 to an underside of the vehicle, though the interior vehicle component 32 could be one or more other components disposed inward relative to the bumper beam. The configuration of the bumper assembly 10 is such that the protective bracket 30 engages the interior vehicle component 32 during an impact to the depending portion 20 to limit or prevent movement of the powered vehicle component 22 into the interior vehicle component 32.

Figure 3:
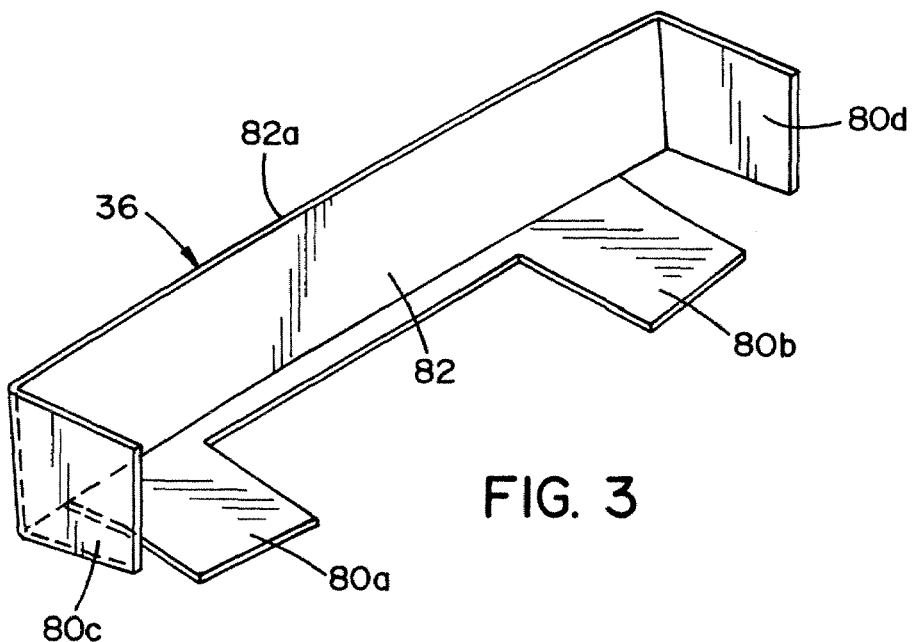
FIG. 3 is a perspective view of a protective bracket, or at least a portion thereof.
Figure 2:
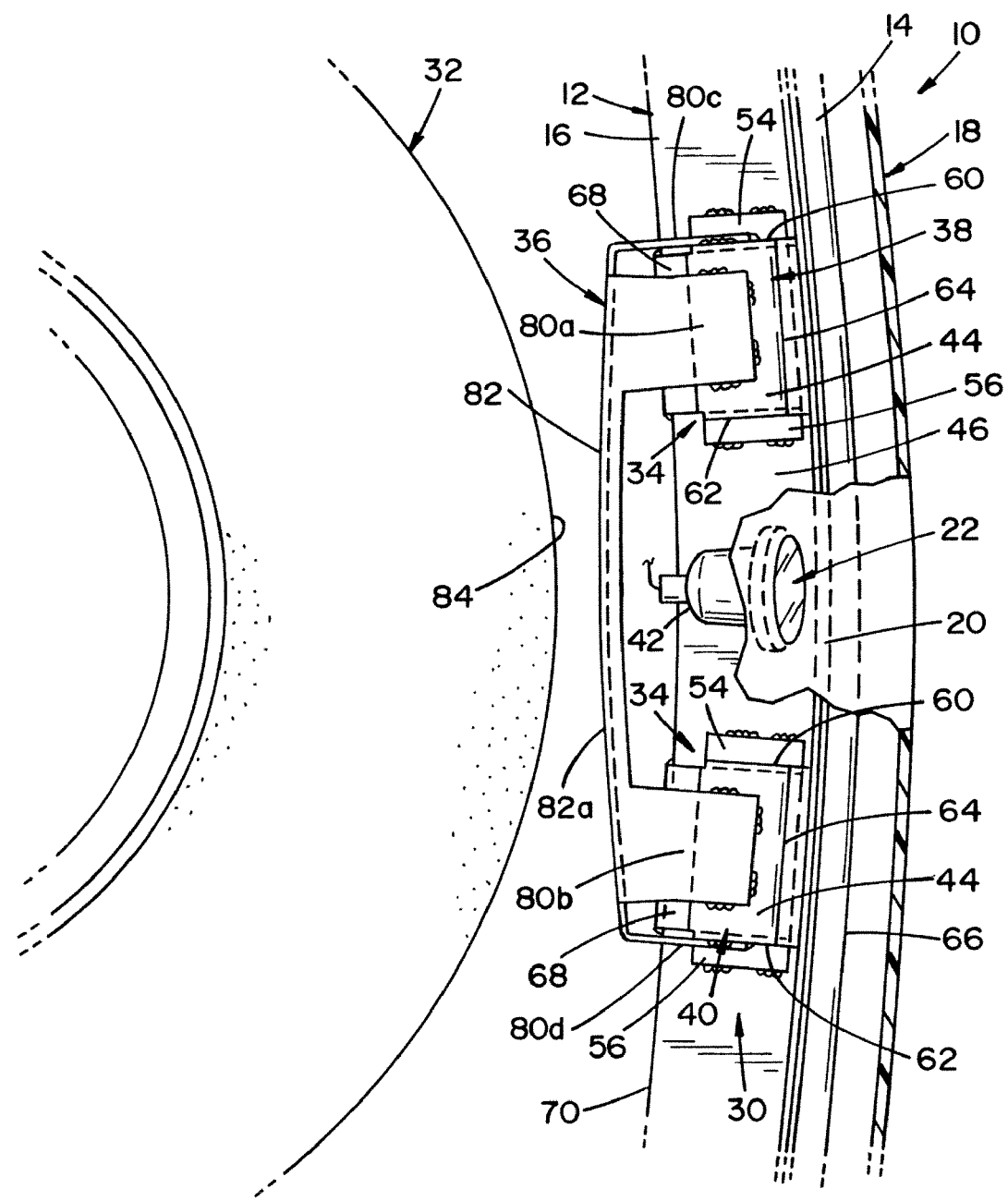
FIG. 2 is an underside partial cross sectional view of the bumper assembly of FIG. 1.
Figure 4:
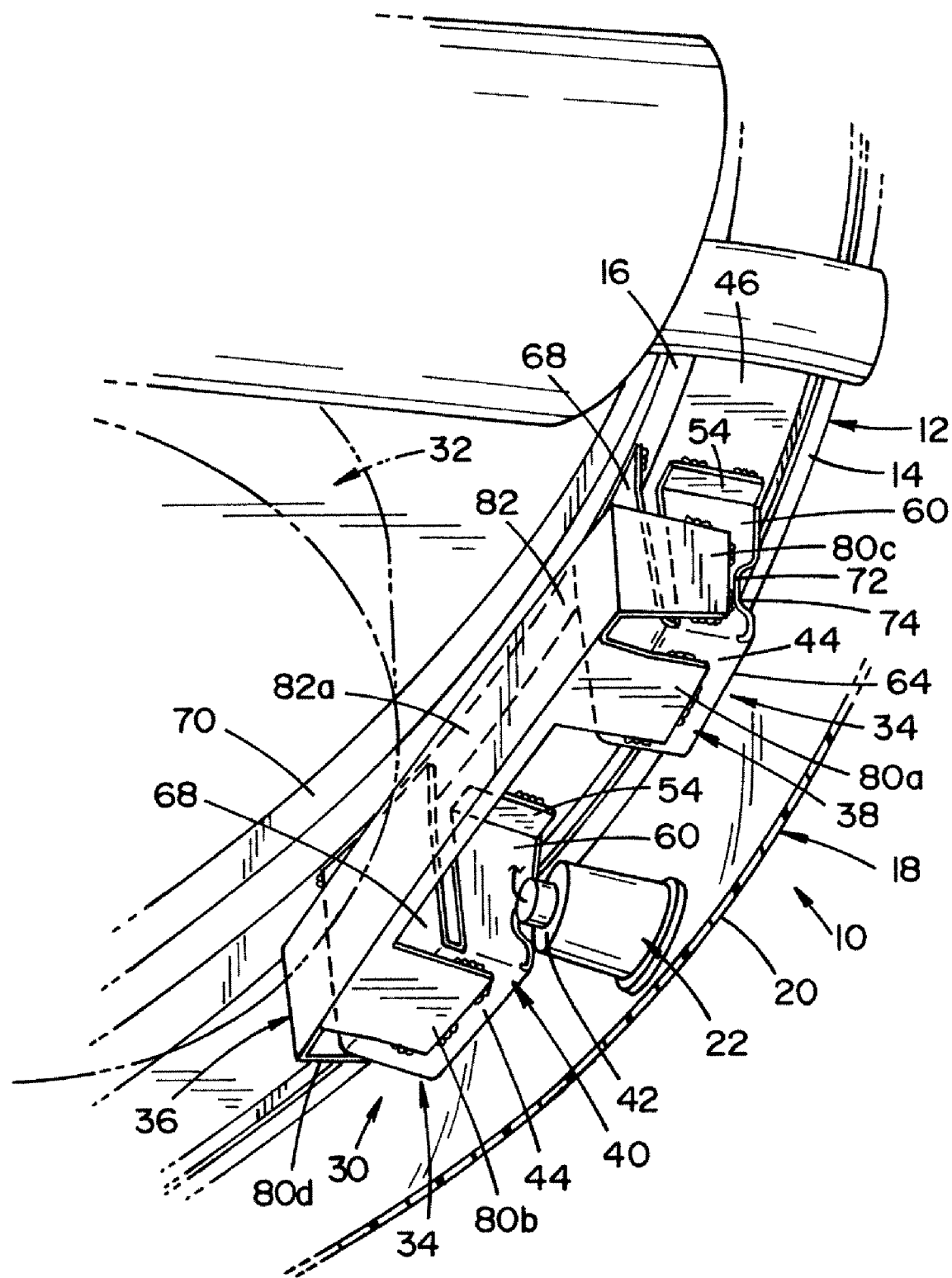
FIG. 4 is an underside perspective view of the bumper assembly of FIG. 1.

With additional reference to FIGS. 2-4, the protective bracket 30 includes a first bracket portion 34 and a second bracket portion 36. The first bracket portion 34 includes at least one box-shaped structure depending downwardly from the bumper beam 12. In the illustrated embodiment, the first bracket portion 34 includes a pair of spaced apart box-shaped structures 38,40, each depending downwardly from the bumper beam 12 for receiving impact forces directed below the bumper beam and transmitting such impact forces to the bumper beam. Specifically, the pair of box-shaped structures includes first box-shaped structure 38 and second box-shaped structure 40, which are laterally spaced apart from one another along the bumper beam 12. As will be described in more detail below, each box-shaped structure 38,40 may include a lower wall 44 spaced apart from and generally parallel to a bottom wall 46 of the bumper beam 12, and includes at least one side wall (e.g., walls 60,62,64,68) extending from the bottom wall 46 to the lower wall 44.

In the illustrated embodiment, each of the box-shaped structures 38,40 may have a pair of flanged ends 54,56 mated to the bottom wall 46 of the bumper beam 12, such as by welding. Each box-shaped structure 38,40 may also include spaced apart sidewalls 60,62 depending from the flanged ends 54,56, respectively. The spaced apart side walls 60,62 support the lower wall 44 in spaced and generally parallel relation to the bottom wall 46 of the bumper beam 12.

Each of the box-shaped structures 38,40 may also include an outer sidewall 64 depending from the bumper beam 12 and generally parallel to an outer side 66 of the bumper beam 12 and an inner wall 68 depending from the bumper beam 12 and generally parallel to an inner side 70 of the bumper beam 12. As shown, the spaced apart side walls 60,62 can include notches 72 formed in outer edges thereof and the outer wall 64 can include a channel portion 74 received in the notches 72. Alternatively, each box-shaped structure can be formed separately from at least two members, e.g., a first stamped member can include the flanged ends 54,56, the sidewalls 60,62 and the bottom wall 44 and a second stamped member can include the walls 64,68 and an additional lower wall (not shown) overlaying the lower wall 44 of the first stamped member.

The second bracket portion 36 is connected to the first bracket portion 34 (i.e., the box-shaped structures 38,40 in the illustrated embodiment) and extends inwardly away from the depending portion 20 of the bumper fascia 18. The second bracket portion 36 is oriented so as to contact the interior vehicle component 32, i.e., spare tire in the illustrated embodiment, during a collision impact to limit movement of the powered vehicle component 22 and thereby prevent or limit a rear side 42 of the powered vehicle component 22 from contacting the interior vehicle component 32.

With specific reference to FIG. 3, the second bracket portion 36 can include arms 80 and extending inwardly into the vehicle away from the depending portion 20 of the bumper fascia 18. The spaced apart end arms 80c,80d overlay opposite sidewalls 60,62 of the first bracket portion 34 and the underside arms 80a,80b overlay bottom walls 44 of the first bracket portion 34. In the illustrated embodiment, the end arms 80c,80d are oriented in generally perpendicular relation relative to the underside arms 80a,80b and the plate 82. The second bracket portion 36 can further include a plate 82 (or plate portion) supported by the arms 80a-d and extending laterally across the vehicle (i.e., parallel to the direction in which the bumper beam 12 extends laterally across the vehicle). With additional reference to FIG. 4, in one exemplary embodiment, the plate 82 is oriented so as to contact tread area 84 of the spare tire 32 during a collision impact to prevent or limit the powered vehicle component 22 from contacting the spare tire 32. As shown, the second bracket portion 36 extends inwardly into the vehicle away from the depending portion 20 to a location spaced longitudinally apart from the rear side 70 of the bumper beam 12. In particular, in the illustrated embodiment, lower arms 80a,80b overlay and are mounted via welding to the lower walls 44 of the box-shaped structures 38,40. Side arms 80c,80d overlay and are mounted via welding to sidewall 60 of first box-shaped structure 38 and sidewall 62 of second box-shaped structure 40.

More particularly, the plate 82 has an innerface 82a spaced in close relation to the tread area 84 of the underside mounted spare tire 32 such that, when impact is received below the bumper beam 12, (e.g., in the area of the depending portion 20 of the bumper fascia 18), the plate 82 contacts the tread area 84 of the spare tire 32 to prevent or limit the powered vehicle component 22, which is mounted below the bumper beam 12, from contacting the interior vehicle component 32 and suffering severe damage.

Figure 5:
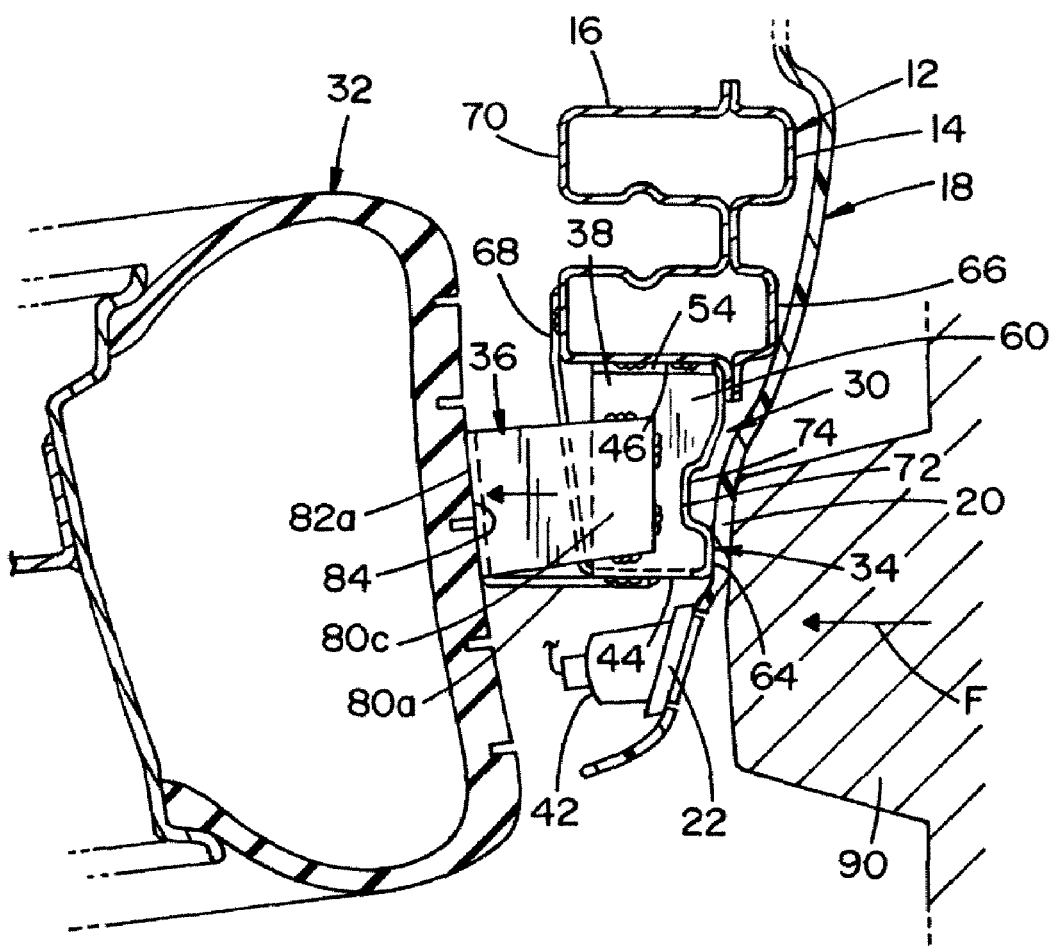
FIG. 5 is a cross sectional view of the bumper assembly of FIG. 1 shown with an impact force being applied to the bumper fascia.

With reference to FIG. 5, the protective bracket 30 is shown preventing the powered vehicle component 22 from contacting the interior vehicle component 32 when an impact force F is delivered to the depending portion 20 of the bumper fascia 18. In particular, in FIG. 5, an impact force F from impact member 90 is shown being delivered to the depending portion 20 of the bumper fascia 18. This impact force causes the bumper fascia 18 and the protective bracket 30 to be thrust inward into the vehicle toward the powered vehicle component 22. The second bracket portion 36 is shown engaging the interior vehicle component, such as the tread area 84 of the spare tire, which stops further movement of the depending portion 20, including the powered vehicle component 22, in the direction of the interior vehicle component 32. In this manner, the protective bracket 30 prevents or limits rear side contact of the powered vehicle component 22 with the interior vehicle component 32.

It will be appreciated that various of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A bumper assembly for a vehicle, comprising:
a bumper beam extending laterally across the vehicle;
a bumper fascia covering said bumper beam, said bumper fascia including a depending portion extending downward below said bumper beam;
a powered vehicle component mounted in said depending portion of said bumper fascia; and
a protective bracket mounted below said bumper beam to limit contact of said powered vehicle component during a collision impact to said depending portion of said bumper fascia.

2. The bumper assembly of claim 1 wherein said protective bracket includes:

a first bracket portion depending downwardly from said bumper beam for receiving impact forces directed below said bumper beam and transmitting said impact forces to said bumper beam; and a second bracket portion connected to said first bracket portion and extending inwardly away from said depending portion of said bumper fascia, said second bracket portion contacting an interior vehicle component during a collision impact to limit movement of said powered vehicle component and thereby preventing a rearside of said powered vehicle component from contacting said interior vehicle component.

3. The bumper assembly of claim 2 wherein said interior vehicle component is a spare tire mounted to an underside of the vehicle.

4. The bumper assembly of claim 3 wherein said second bracket portion includes arms extending inwardly into the vehicle away from said depending portion, and further includes a plate supported by said arms and extending laterally across said vehicle, said plate contacting a tread area of said spare tire during a collision impact to prevent said powered vehicle component from contacting said spare tire.

5. The bumper assembly of claim 2 wherein said second bracket portion extends inwardly into the vehicle away from said depending portion to a location spaced longitudinally apart from a rear side of said bumper beam.

6. The bumper assembly of claim 2 wherein said first bracket portion includes:

at least one box-shaped structure depending downwardly from said bumper beam, each of said at least one box-shaped structure including a lower wall spaced apart from and generally parallel to a bottom wall of said bumper beam, and including at least one sidewall extending from said bottom wall of said bumper beam to said lower wall.

7. The bumper assembly of claim 6 wherein said at least one box-shaped structure includes a first box-shaped structure and a second box-shaped structure, said first and second box-shaped structures laterally spaced apart from one another along said bumper beam.

8. The bumper beam assembly of claim 6 wherein each of said at least one box-shaped structure includes:

a pair flanged ends mated to said bottom wall of said bumper beam, spaced apart sidewalls respectively depending from said flanged ends, and said lower wall.

9. The bumper beam assembly of claim 8 wherein each of said at least one box-shaped structure further includes:

an outer wall depending from said bumper beam and generally parallel to an outer side of said bumper beam and an inner wall depending from said bumper beam and generally parallel to an inner side of said bumper beam.

10. The bumper beam assembly of claim 9 wherein said spaced apart sidewalls includes notches formed in outer edges thereof and said outer wall includes a channel portion received in said notches.

11. The bumper assembly of claim 10 wherein said second bracket portion includes arms overlaying and mounted to at least one of said spaced apart sidewalls and to said lower wall.

12. The bumper assembly of claim 1 wherein said powered vehicle component is a fog light.

13. The bumper assembly of claim 1 wherein said powered vehicle component is disposed vertically below said bracket.

14. The bumper assembly of claim 1 wherein said protective bracket is positioned adjacent an underside mounted spare tire and contacts said spare tire during said collision impact to prevent said powered vehicle component from contacting said spare tire.

15. A vehicle bumper assembly, comprising:

a bumper beam mounted to a vehicle;

a bumper fascia disposed over said bumper beam with a depending portion extending below said bumper beam;

a vehicle light component mounted on said depending portion; and a protective bracket mounted below said bumper beam protecting said vehicle light component during a sufficient impact to said depending portion of said bumper fascia by obstructing movement of said vehicle light component into an interior vehicle component disposed inwardly relative to said bumper beam.

16. The vehicle bumper assembly of claim 15 wherein said interior vehicle component is a spare tire mounted inwardly relative to said bumper beam, said protective bracket engaging said spare tire during an impact to said depending portion to limit movement of said vehicle light component into said spare tire.

17. The vehicle bumper assembly of claim 15 wherein said protective bracket includes:

a first bracket portion depending downwardly from said bumper beam;

a second bracket portion connected to said first bracket portion and extending inwardly away from said depending portion of said bumper fascia, said second bracket portion including arms extending inwardly into the vehicle away from said depending portion, and further including a plate supported by said arms and extending laterally, said plate contacting said interior vehicle component during said sufficient impact to protect said vehicle light component.

18. The vehicle bumper assembly of claim 15 wherein said vehicle light component is a fog light spaced vertically below said bumper beam and said protective bracket.

19. A protective bracket of a vehicle bumper assembly for a vehicle light component, the vehicle bumper assembly including a bumper beam and a bracket portion depending downwardly from the bumper beam, said protective bracket comprising:

arms extending inwardly from said bracket portion;

a plate supported by said arms, said plate having an inner face spaced in close relation to a tread area of an underside mounted spare tire such that, when an impact is received below said bumper beam, said plate contacts said tread area of said spare tire to prevent the vehicle light component, which is mounted below the bumper beam, from contacting said spare tire.

20. The protective bracket of claim 19 wherein said arms include a pair of spaced apart end arms overlaying sidewalls of the bracket portion and a pair of underside arms overlaying bottom walls of the bracket portion, said end arms oriented in perpendicular relation relative to said underside arms.

\* \* \* \* \*